Figure 1:

United States Patent Office 2,952,650
Patented Sept. 13, 1960

2,952,650

BUTYL RUBBER POWDER, METHOD OF MAKING, AND ASPHALT COMPOSITION CONTAINING SAME

Paul R. Wood, Naugatuck, Conn., assignor to United States Rubber Company, New York, N.Y., a corporation of New Jersey Filed Aug. 29, 1957, Ser. No. 681,064

8 Claims. (Cl. 260—28.5)

This invention relates to improvements in rubber powder for incorporation in the asphalt binder used in building roads, and for other purposes, and to the method of making such rubber powder.

Various methods have been suggested for incorporating rubbers in the hot asphalt which is used in road surfacing, e.g. as the binder for the aggregate in paving constructions, and for roofing and other purposes, generally in the amount from 1 to 20 parts per 100 parts of the asphalt. Rubber latices have been added to the hot asphalt but this is impractical because of the foaming produced by the water boiling-off. Various types of ground solid rubbers, and rubber powders usually prepared from latex have been added to the hot asphalt. Ground solid rubbers present a serious grinding and detackification problem, disperse slowly in hot asphalt, and separate out on non-agitated hot storage.

By the present invention, a powder is prepared from a solid rubber which on mixing with hot asphalt readily disperses uniformly therein in a short time and does not separate out on hot storage.

According to the present invention, Butyl rubber (which is the conventional name for isobutylene-isoprene copolymer synthetic rubber) is masticated at elevated temperature with a rubber plasticizer, carbon black and vulcanizing ingredients until the rubber vulcanizes or cures to the stage where the product undergoing mastication forms into a powder. Such partially vulcanized Butyl rubber powder when added to hot asphalt becomes uniformly dispersed therein to give a smooth blend and does not separate out on hot storage.

In carrying out the present invention, raw or virgin isobutylene-isoprene copolymer, generally referred to herein by its conventional name Butyl rubber, is masticated on a rubber mill or in a Banbury mixer with 10 to 100 parts of plasticizer and 10 to 50 parts of carbon black per 100 parts of the Butyl rubber and with conventional vulcanizing ingredients that will cure the rubber at conventional vulcanizing temperatures from 250° F. to 350° F., and the heat is allowed to build up in the mass to curing temperatures between 250° F. and 350° F., and the mastication and heating is continued until the Butyl rubber is partially vulcanized to the extent or stage where the constant shearing of the material being masticated on the mill or in the Banbury causes disintegration of the mass and produces a powdered material. The powdered material may be used in this form or may be further ground for addition to hot asphalt. A powder is produced when enough cross-links are formed to raise the modulus of the mass to such a point that knitting of the rubber does not take place after shearing has separated small particles. On the other hand, in the conventional partial vulcanization of Butyl rubber for manufacturing Butyl rubber articles by further vulcanization to complete cure, the partial cure is not carried as far as the powdered state, and the partially cured Butyl rubber comes from the rubber mill or Banbury as a coherent solid sheet or mass which is subsequently shaped and completely cured.

The thus prepared partially vulcanized Butyl rubber powder of the present invention may be readily blended with the hot asphalt at a temperature from 250° F. to 450° F. (generally 300° F. to 350° F.) in amount from 1 to 20 parts of Butyl rubber content per 100 parts of the asphalt. The asphalt may be a conventional asphalt having a penetration value from 40 to 300. Asphalt binders are graded according to penetration values at 77° F. as measured by the Standard Method for Penetration of Bituminous Materials (A.S.T.M. D5–52), the penetration values being measured as the tenths of a millimeter that a tapered standard needle (0.14 to 0.16 mm. tip diameter) will penetrate the asphalt at 77° F. in five seconds with a 100 gram load. It is believed that when the partially vulcanized Butyl rubber powder is blended with the hot asphalt a reversion of cure takes place which gives the uniform dispersion of the Butyl rubber. On the other hand when the same Butyl rubber compound is wholly vulcanized, as in a press cure, and the vulcanized product ground to the same size as the Butyl rubber powder of the present invention, the ground vulcanized Butyl rubber particles are only slightly swollen in the hot asphalt without being dispersed therein, and will separate out from the asphalt on hot storage.

The isobutylene-isoprene copolymer synthetic rubber used in the present invention is the conventional Butyl rubber which is a copolymer of a major proportion of isobutylene and a minor proportion of isoprene, usually a copolymer of 95 to 99.5 parts of isobutylene and correspondingly 5 to 0.5 parts of isoprene which has a Staudinger molecular weight in the range from 20,000 to 500,000. The rubber plasticizer used may be an asphalt similar to the asphalts used in roads having a penetration value from 40 to 300, or an asphaltite, such as Gilsonite, or a rubber processing oil. Such rubber processing oil may be an aromatic, naphthenic or asphaltic rubber softening oil. Such processing or softening oils, as is known, may be distilled oil fractions or residual oils from the distillation of petroleum, or distilled oil fractions from the distillation of coal tar. The vulcanizing ingredients used are the conventional vulcanizing ingredients, e.g. 1 to 10 parts of sulfur, and 0.5 to 3 parts of a vulcanizing accelerator per 100 parts of the Butyl rubber. The accelerator may be any of the conventional accelerators that vulcanize rubber at temperatures from 250° F. to 350° F., such as the "thiazoles" (benzothiazole derivatives): 2-mercaptobenzothiazole, zinc salt of 2-mercaptobenzothiazole, 3-anilinomethyl-2(3)-benzothiazolethione, dibenzothiazyl disulfide; the "thiurams" (thiuram sulfides): tetramethyl thiuram monosulfide, tetramethyl thiuramdisulfide, tetraethyl thiuram disulfide; the "dithiocarbamates" (salts of dithiocarbamic acids): zinc dimethyl dithiocarbamate, zinc diethyl dithiocarbamate, zinc dibutyl dithiocarbamate, zinc N-pentamethylene dithiocarbamate, 2,4-dinitrophenyl dimethyl dithiocarbamate, selenium diethyl dithiocarbamate. The vulcanizing ingredients may also comprise the usuel 2 to 10 parts of zinc oxide per 100 parts of the Butyl rubber, but the zinc oxide is not necessary for the partial vulcanization. The carbon black which is used in amounts from 10 to 50 parts per 100 parts of the Butyl rubber may be any conventional carbon black, e.g. FEF (Fast Extruding Furnace), HAF (High Abrasion Furnace), SAF (Superior Abrasion Furnace), HMF (High Modulus Furnace), EPC (Easy Processing Channel), MPC (Medium Processing Channel) black.

The following examples illustrate the invention. All parts and percentages referred to herein are by weight.

*Example 1*

63.5 parts of Butyl rubber (copolymer of 95 to 99.5 parts of isobutylene and correspondingly 5 to 0.5 part of isoprene), 21 parts of MPC carbon black, 1.2 parts of sulfur, 2 parts of zinc oxide, 0.8 part of tetramethyl thiuram disulfide and 11.5 parts of Gilsonite were mixed in a Banbury. This formulation will cure at conventional vulcanizing temperatures of 250° F. to 350° F. Heat was allowed to build up in the mass during mastication to a temperature of about 340° F. and the mastication and heating was continued until the constant shearing of the mass produced a fine powdered material which was then dumped in air. About 95% of the powder would pass through a 20-mesh screen. The time of the mastication and heating, i.e. the Banbury cycle, was about 4 minutes. In other cases, the time of mastication and heating may be from 2 to 15 or more minutes to produce the partially vulcanized Butyl rubber powder.

Five parts of the above Butyl rubber powder were added to 95 parts of hot 100–120 penetration asphalt and after 4 hours heating at 325° F. reversion of the partially vulcanized rubber powder took place which resulted in a smooth uniform blend of finely dispersed rubber in the asphalt which did not separate out on hot storage. A photomicrograph of the thus produced asphalt-rubber blend (250×) is shown in Figure 1 of the drawing. The uniform dispersion of the rubber, which appears as black particles, is readily seen.

Figure 2:
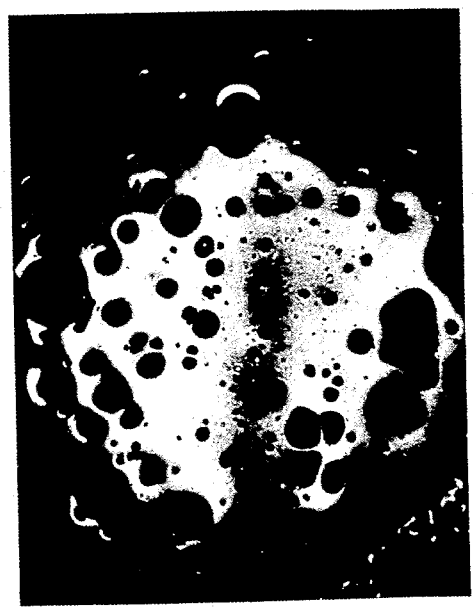

A second batch of the above recipe was mixed and fully vulcanized as a regular Butyl rubber stock in a heated press at 292° F. for 30 minutes at 500 lbs. per sq. in. pressure. The cured stock was then ground to the same size powder as the partially vulcanized powder prepared above. Five parts of this fully vulcanized Butyl rubber powder was added to 95 parts of the 100–120 penetration hot asphalt and stirred at 325° F. for 24 hours. Even after 24 hours the particles were only slightly swollen and did not disperse. A photomicrograph of the thus produced non-dispersed asphalt-rubber blend (25×) is shown in Figure 2 of the drawing, the large black particles being the rubber powder. That the individual particles of vulcanized rubber are not uniformly dispersed in the asphalt is clear from the photomicrograph.

*Example 2*

The same Butyl rubber as used in Example 1 was compounded in a Banbury according to Formulas 1 to 4 in the table below:

| Formula | Parts by weight | | | |
| --- | --- | --- | --- | --- |
| | No. 1 | No. 2 | No. 3 | No. 4 |
| Butyl rubber | 63.0 | 62.0 | 55.0 | 57.0 |
| Carbon black (MPC) | 21.0 | 20.0 | 18.0 | 19.0 |
| Sulfur | 1.5 | 1.8 | 1.4 | 1.4 |
| Zinc oxide | 2.5 | 3.0 | 2.5 | 2.6 |
| Tetramethyl thiuram disulfide | 1.0 | 1.2 | 1.1 | 1.0 |
| Paving asphalt 120 penetration | 11.0 | | | |
| Circosol-2XH (naphthenic rubber processing oil) | | 12.0 | 22.0 | |
| "Red Wax" (coal tar fraction) | | | | 19.0 |

Mastication of the above mixtures was continued in the Banbury with heat build-up to between 250° F. and 350° F. After partial curing and formation of the rubber powders the batches were dumped in air. 5 parts of each of the powders of Formulas 1 to 4 were blended in 95 parts of 100–120 penetration asphalt at about 325° F. In two to six hours, smooth blends were produced in which the rubber was uniformly dispersed. The rubber in these blends would not settle out on hot storage.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of making a rubber powder which comprises masticating at a temperature from 250° F. to 350° F. 100 parts of a synthetic rubber copolymer of 95 to 99.5 parts of isobutylene and correspondingly 5 to 0.5 part of isoprene, with 10 to 100 parts of plasticizer, 10 to 50 parts of carbon black, and 1 to 10 parts of sulfur and 0.5 to 3 parts of tetramethyl thiuram disulfide, said sulfur and tetramethyl thiuram disulfide being in amount that will cure the rubber at 250° F. to 350° F., until the mixture is vulcanized to the stage where it forms a powder.

2. A rubber powder which is the product of masticating at a temperature from 250° F. to 350° F. a mixture of 100 parts of a synthetic rubber copolymer of 95 to 99.5 parts of isobutylene and correspondingly 5 to 0.5 part of isoprene, 10 to 100 parts of plasticizer, 10 to 50 parts of carbon black, and 1 to 10 parts of sulfur and 0.5 to 3 parts of tetramethyl thiuram disulfide, said sulfur and tetramethyl thiuram disulfide being in amount that will cure the rubber at 250° F. to 350° F., until the mixture is vulcanized to the stage where it forms a powder.

3. A composition comprising asphalt and rubber powder, said rubber powder being the product of masticating at a temperature from 250° F. to 350° F. a mixture of 100 parts of a synthetic rubber copolymer of 95 to 99.5 parts of isobutylene and correspondingly 5 to 0.5 part of isoprene, 10 to 100 parts of plasticizer, 10 to 50 parts of carbon black, and 1 to 10 parts of sulfur and 0.5 to 3 parts of tetramethyl thiuram disulfide, said sulfur and tetramethyl thiuram disulfide being in amount that will cure the rubber at 250° F. to 350° F., until the mixture is vulcanized to the stage where it forms a powder, said powder being present in said composition in amount from 1 to 20 parts of the rubber content per 100 parts of said asphalt.

4. The method of preparing an asphalt composition which comprises blending with asphalt a rubber powder which is the product of masticating at a temperature from 250° F. to 350° F. a mixture of 100 parts of a synthetic rubber copolymer of 95 to 99.5 parts of isobutylene and correspondingly 5 to 0.5 part of isoprene, 10 to 100 parts of plasticizer, 10 to 50 parts of carbon black, and 1 to 10 parts of sulfur and 0.5 to 3 parts of tetramethyl thiuram disulfide, said sulfur and tetramethyl thiuram disulfide being in amount that will cure the rubber at 250° F. to 350° F., until the mixture is vulcanized to the stage where it forms a powder.

5. The method of making a rubber powder which comprises masticating at a temperature from 250° F. to 350° F. 100 parts of a synthetic rubber copolymer of 95 to 99.5 parts of isobutylene and correspondingly 5 to 0.5 part of isoprene with 10 to 100 parts of plasticizer, 10 to 50 parts of carbon black, and 1 to 10 parts of sulfur and 0.5 to 3 parts of an accelerator selected from the group consisting of 2-mercaptobenzothiazole, zinc salt of 2-mercaptobenzothiazole, 3-anilinomethyl-2(3)-benzothiazolethione, dibenzothiazyl disulfide, tetramethyl thiuram monosulfide, tetramethyl thiuram disulfide, tetraethyl thiuram disulfide, zinc dimethyl dithiocarbamate, zinc diethyl dithiocarbamate, zinc dibutyl dithiocarbamate, zinc N-pentamethylene dithiocarbamate, 2,4-dinitrophenyl dimethyl dithiocarbamate and selenium diethyl dithiocarbamate, said sulfur and accelerator being in amount that will cure the rubber at 250° F. to 350° F., until the mixture is vulcanized to the stage where it forms a powder.

6. A rubber powder which is the product of masticating at a temperature from 250° F. to 350° F. a mixture of 100 parts of a synthetic rubber copolymer of 95 to 99.5 parts of isobutylene and correspondingly 5 to 0.5 part of isoprene, 10 to 100 parts of plasticizer, 10 to 50 parts of carbon black, and 1 to 10 parts of sulfur and 0.5 to 3 parts of an accelerator selected from the group consisting of 2-mercaptobenzothiazole, zinc salt of 2-mercaptobenzothiazole, 3-anilinomethyl-2(3)-benzothiazolethione, dibenzothiazyl disulfide, tetramethyl thiuram monosulfide, tetramethyl thiuram disulfide, tetraethyl thiuram disulfide, zinc dimethyl dithiocarbamate, zinc diethyl dithiocarbamate, zinc dibutyl dithiocarbamate zinc N-pentamethylene dithiocarbamate, 2,4-dinitrophenyl dimethyl dithiocarbamate and selenium diethyl dithiocarbamate, said sulfur and accelerator being in amount that will cure the rubber at 250° F. to 350° F., until the mixture is vulcanized to the stage where it forms a powder.

7. A composition comprising asphalt and rubber powder, said rubber powder being the product of masticating at a temperature from 250° F. to 350° F. a mixture of 100 parts of a synthetic rubber copolymer of 95 to 99.5 parts of isobutylene and correspondingly 5 to 0.5 part of isoprene, 10 to 100 parts of plasticizer, 10 to 50 parts of carbon black, and 1 to 10 parts of sulfur and 0.5 to 3 parts of an accelerator selected from the group consisting of 2-mercaptobenzothiazole, zinc salt of 2-mercaptobenzothiazole, 3-anilinomethyl-2(3)-benzothiazolethione, dibenzothiazyl disulfide, tetramethyl thiuram monosulfide, tetramethyl thiuram disulfide, tetraethyl thiuram disulfide, zinc dimethyl dithiocarbamate, zinc diethyl dithiocarbamate, zinc dibutyl dithiocarbamate, zinc N-pentamethylene dithiocarbamate, 2,4 - dinitrophenyl dimethyl dithiocarbamate and selenium diethyl dithiocarbamate, said sulfur and accelerator being in amount that will cure the rubber at 250° F. to 350° F., until the mixture is vulcanized to the stage where it forms a powder, said powder being present in said composition in amount from 1 to 20 parts of the rubber content per 100 parts of said asphalt.

8. The method of preparing an asphalt composition which comprises blending with asphalt a rubber powder which is the product of masticating at a temperature from 250° F. to 350° F. a mixture of 100 parts of a synthetic rubber copolymer of 95 to 99.5 parts of isobutylene and correspondingly 5 to 0.5 part of isoprene, 10 to 100 parts of plasticizer, 10 to 50 parts of carbon black, and 1 to 10 parts of sulfur and 0.5 to 3 parts of an accelerator selected from the group consisting of 2-mercaptobenzothiazole, zinc salt of 2-mercaptobenzothiazole, 3-anilinomethyl-2(3)-benzothiazolethione, dibenzothiazyl disulfide, tetramethyl thiuram monosulfide, tetramethyl thiuram disulfide, tetraethyl thiuram disulfide, zinc dimethyl dithiocarbamate, zinc diethyl dithiocarbamate, zinc dibutyl dithiocarbamate, zinc N-pentamethylene dithiocarbamate, 2,4-dinitrophenyl dimethyl dithiocarbamate and selenium diethyl dithiocarbamate, said sulfur and accelerator being in amount that will cure the rubber at 250° F. to 350° F., until the mixture is vulcanized to the stage where it forms a powder.

References Cited in the file of this patent
UNITED STATES PATENTS

| | | |
|---|---|---|
| 2,771,936 | Iknayan et al. | Nov. 27, 1956 |
| 2,807,596 | Flickinger | Sept. 24, 1957 |
| 2,809,179 | Endres et al. | Oct. 8, 1957 |
| 2,811,502 | Gessler et al. | Oct. 29, 1957 |
| 2,822,342 | Ford et al. | Feb. 4, 1958 |

OTHER REFERENCES

Bulletin of the University of Utah, volume 41, No. 1, April 1951, pages 53–55.